May 30, 1939.  F. LEISTER  2,160,220
BEARING
Filed Aug. 24, 1936   2 Sheets-Sheet 1
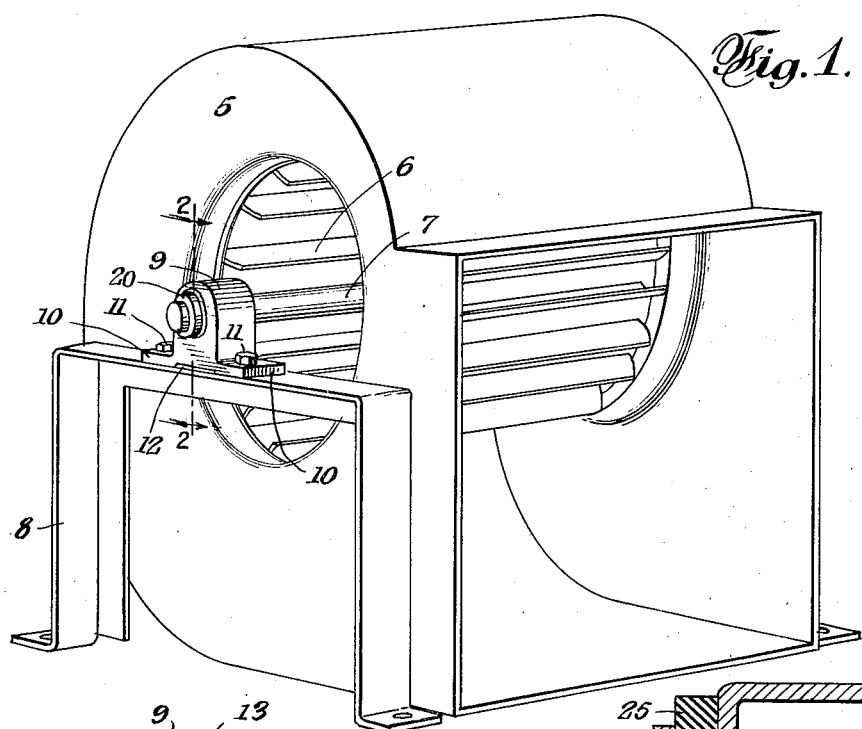
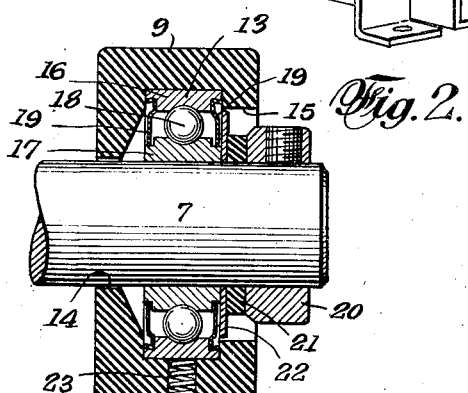
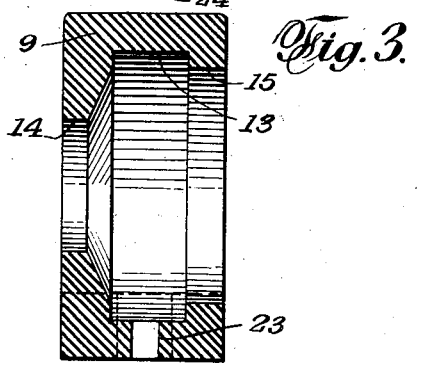
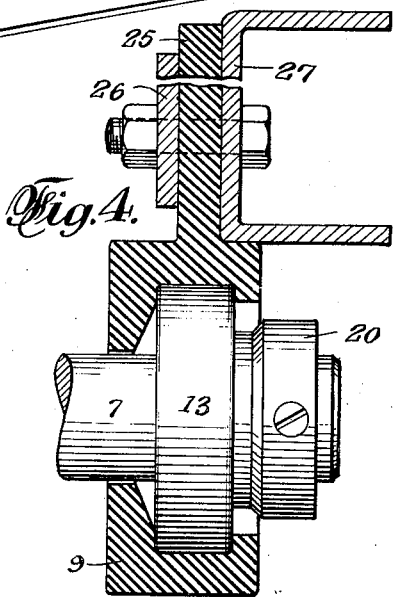
INVENTOR
FAYETTE LEISTER
ATTORNEYS May 30, 1939.  F. LEISTER  2,160,220
BEARING
Filed Aug. 24, 1936   2 Sheets-Sheet 2
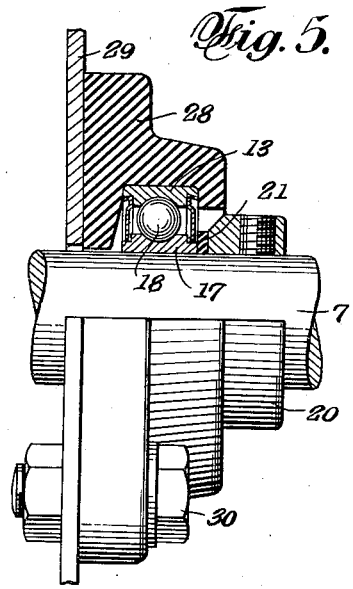
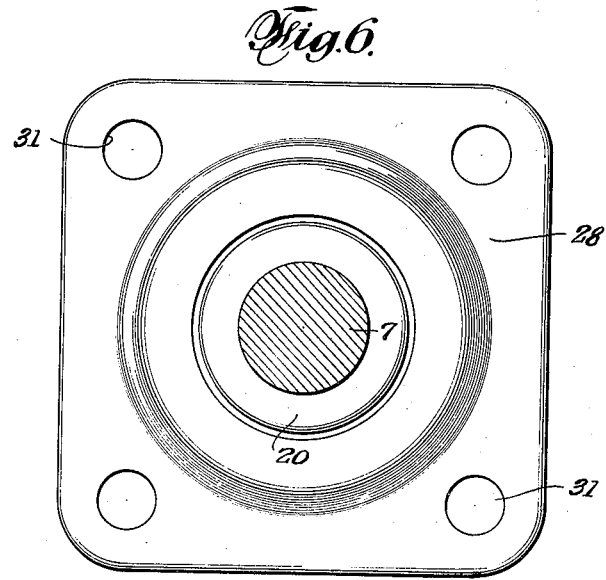
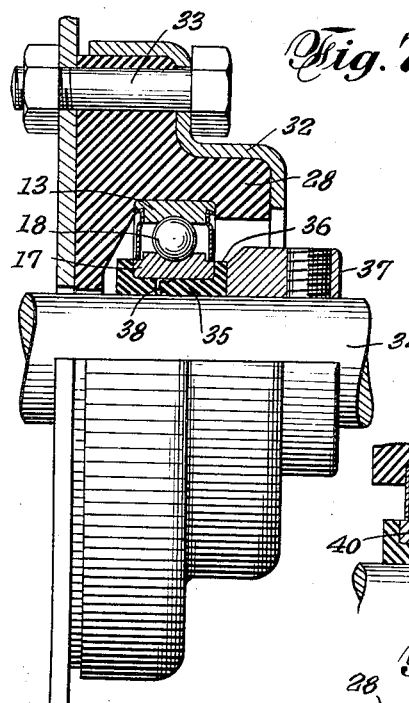
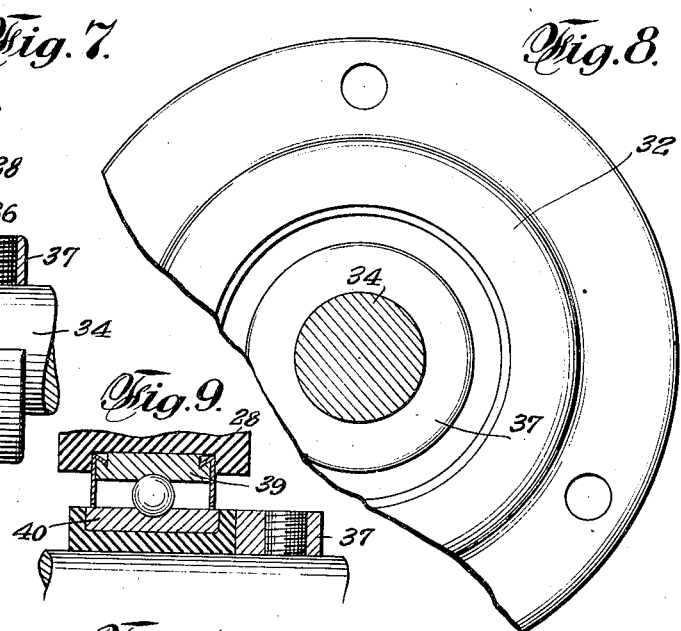
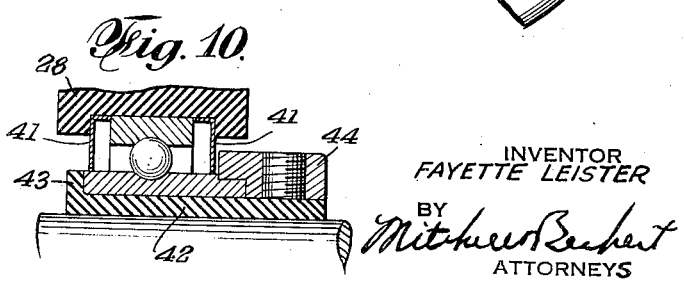
INVENTOR
FAYETTE LEISTER
BY
ATTORNEYS Patented May 30, 1939

2,160,220

UNITED STATES PATENT OFFICE 2,160,220

BEARING

Fayette Leister, Detroit, Mich., assignor to The Fafnir Bearing Company, New Britain, Conn., a corporation of Connecticut Application August 24, 1936, Serial No. 97,485

7 Claims. (Cl. 308—184)

My invention relates to a bearing mounting and more particularly to a mounting for deadening bearing noises.

It is an object of the invention to provide an improved form of sound deadening bearing mounting, simple in construction, relatively cheap to manufacture, and effective in use.

Another object is to provide means for mounting a bearing so as to deaden bearing noises by insulating the same from a support and providing improved means for grounding the bearing to prevent the accumulation of static charges thereon.

It is another object to provide an improved form of sound deadening bearing mounting having improved features to lengthen the life of the mounting and maintain its effectiveness over a long period.

Other objects and various features of the invention will be hereinafter pointed out or will become apparent to those skilled in the art.

In the drawings which show, for illustrative purposes only, preferred forms of the invention:

Fig. 1 is an isometric view of a fan or blower having bearing mountings, illustrating features of the invention;

Fig. 2 is a sectional view, taken substantially in the plane of the line 2—2 of Fig. 1;

Fig. 3 is a sectional view, like Fig. 2, showing a housing with all bearing parts removed;

Fig. 4 is a central, vertical, sectional view through a modified form of a sound deadening housing;

Fig. 5 is an edge view in quarter section of a modified form of bearing mounting;

Fig. 6 is an axial view in elevation of the mounting shown in Fig. 5;

Fig. 7 is a view similar to Fig. 5, illustrating a modification;

Fig. 8 is a fragmentary view in axial elevation of the form shown in Fig. 7;

Fig. 9 is a fragmentary view of a mounting as disclosed in Fig. 7, but showing slight modifications;

Fig. 10 is a view similar to Fig. 9, illustrating further modifications.

My improved bearing mountings may be employed in various machines and devices and in Fig. 1 is illustrated the application of one form of my improved bearing mounting in a fan or blower which may be one used in an air conditioning system. The fan which per se forms no part of my invention may comprise a casing 5 and a rotor 6, supported on a shaft 7, which is in turn mounted in bearings of my improved form. The bearing mountings, as illustrated, are carried by metal supports at opposite ends of the fan casing, as shown at 8.

The bearing mounting includes a block of sound deadening material, preferably live resilient rubber 9. The block may be of generally flat elongated semi-circular shape and have integral relatively thin foot portions 10 at opposite sides. The block and foot portions are designed to be mounted directly on the support 8 by means of bolts 11, or the like, which extend through the foot portions or ears. It will be seen that in the form shown in Figs. 1 to 3, the only substantial stresses due to the securing means 11 will be confined to the feet 10 and will not be transmitted to the main body 9 of the block. It is desirable to provide spacer bushings in the bolt holes extending through the foot 10 to prevent a mechanic from unduly stressing the rubber of the foot portions. While the block 9 in general fits on the spacer 8, I prefer to relieve the block, as indicated at 12, so as to slightly space the same away from the support in the region between the shaft bearing and the support so that the rubber is constantly kept in shear or tension and not in compression. That is desirable in order to prolong the life and resiliency of the rubber. The rubber block is provided with a bearing receiving recess 13, which in the form illustrated extends transversely into the block on one side. When the shaft is to pass through the block, the main body thereof is provided with a shaft passage 14 preferably of a diameter to freely receive the shaft but so as to provide somewhat of a seal against the entry of foreign matter. At the opposite side of the bearing receiving recess 13 there may be an inwardly directed flange 15 to assist in retaining the bearing in place and thus securely hold the bearing and provide a unit handled construction.

The bearing preferably comprises an outer bearing ring 16, an inner bearing ring 17, with interposed anti-friction bearing members such as balls 18. The bearing is preferably of the unit handled type, that is, wherein the balls in the races serve to hold the bearing rings against displacement in all directions. The bearing may be sealed as by means of seal plates 19—19 carried at opposite sides of the outer bearing ring. Thus lubricant will be retained on the bearing and is not likely to leak out with possible damage to a part of the mounting. The shaft 7 passes through the inner ring 7 and in the form illustrated is held against displacement in one direction by means of an abutment such as the set collar 20 secured on the shaft. Between the set collar and the inner ring is a resilient rubber washer or ring 21 which abuts the set collar 20, and if the same does not abut directly against the inner ring it may abut a metal seal plate or washer 22 which itself abuts the inner ring. The seal plate 22 is of value in excluding foreign matter from the bearing.

When two bearing mountings at opposite ends of the shaft are assembled, it is preferable to so mount the shaft therein as to put the bearings under a slight initial axial load. This may be readily accomplished by forcing the set collars 20 toward each other so as to move or urge the inner rings 17 toward each other, thus putting an initial thrust or axial load on the bearings. This initial load, however, is a resilient load due to the inherent resilience of the rubber block 9 and also of the rubber washer 20 when employed. By putting the bearing under an initial stress, the bearing tends to run more quietly, and due to the resilient mounting the shaft may expand and contract freely. This is important in that no provision need be made for a so-called fixed and floating bearing as is necessary when the bearings are mounted in rigid supports.

It will be seen that with a rubber mounting the bearing and fan rotor will be insulated from the support 8. In order to prevent the accumulation of undesirable static charges on the rotating parts, I have provided improved means for grounding the rotating parts. In the form illustrated, the block 9 is provided with an opening 23, and a coil spring 24 is held in the opening so that it will through its resilience contact the outer bearing ring 16 and the support 8. The spring 24 is preferably of such diameter that it may be pushed into the opening 23 and be retained therein with sufficient security while the device is being handled.

In the form shown in Fig. 4, the bearing and housing parts may be substantially the same as those heretofore described. However, only a single foot portion 25 has been shown and such foot portion is backed up by a plate 26 at the side opposite a support 27. The form shown in Fig. 4 may be employed for a hanging shaft, for example the propeller shaft of an automobile, and a substantial noise deadening effect will be produced.

In the form shown in Fig. 5, the two bearing parts may be substantially the same as heretofore described, but the block is of somewhat different shape. The block illustrated is a relatively flat block to fit flatwise against the support 29 and may be secured thereto by means of bolts 30 which pass through bolt holes 31—31 in the block. If desired, the block 28 may be relieved so as to avoid undue stresses as heretofore noted in connection with the form shown in Fig. 1.

In the form shown in Fig. 7, the parts may be the same as those shown in Fig. 5, but in Fig. 7 I show a backing plate 32 substantially fitting the contour of the block 28, and the bolts 33 pass through the block 28, as well as the backing plate 32. In the form shown in Fig. 7 I also insulate the inner ring from the shaft 34 by means of a body of sound deadening material in the form of an annulus 35, preferably of live rubber, which fits within the bore and has end flanges 36 overlapping the side edges of the inner ring, as will be understood. A set collar 37 may abut one edge flange 36 in the same manner that the set collar abutted the rubber washer heretofore described.

In the form shown in Figs. 5 and 7, the outer ring may be grounded to the support by any suitable means, for example as disclosed in Fig. 2. The inner ring may be grounded to the shaft 34, as by means of a wire ground connection 38 passing through the rubber annulus and engaging the bore of the inner ring and the shaft 34.

In the modification shown in Fig. 10, the bearing does not itself carry the seal plates as in the previous figures, but seal plates 41—41, in the form of metal cups having passages for a long inner ring, are seated in the bearing recess and abut the side edges of the outer ring as shown. The long inner ring may be mounted on the long rubber annulus 42, which may have an edge flange 43 at one end, and which at the opposite end extends beyond the inner ring. An eccentric self locking collar 44 of well known form may fit over the annulus 42 and the set screw serves to hold the shaft, annulus and set collar in place. The set collar and inner ring are interengaged in a well known manner.

While various modifications have been disclosed, it is to be understood that numerous other modifications, changes and combinations may be made; for example, the forms illustrated in Figs. 9 and 10 may well be used in connection with the housings disclosed in, say, Figs. 1 to 4, as well as in those disclosed in Figs. 5 to 8.

I claim:

1. In a device of the character indicated, a bearing housing including a block of sound deadening material to be secured to a support, said block of sound deadening material having a bearing recess therein, an anti-friction bearing carried by said bearing recess and comprising an outer bearing ring and an inner bearing ring with interposed anti-friction bearing members, a shaft passing through said inner bearing ring, a collar on said shaft, and a washer of resilient material interposed between said collar and said inner ring.

2. In a device of the character indicated, a bearing housing including a block of rubber having a bearing receiving recess therein, means for securing the same to a support, an anti-friction bearing mounted in said bearing recess and including outer and inner bearing rings with interposed anti-friction bearing members, a shaft in said inner bearing ring, an abutment on said shaft, and a body of resilient material interposed between said abutment and said inner ring.

3. In a device of the character indicated, a bearing housing including a block of rubber having a bearing recess therein, an anti-friction bearing in said recess and including outer and inner bearing rings with interposed anti-friction bearing members, said outer ring being seated in said bearing recess, seal means at opposite sides of said bearing for retaining lubricant therein, a shaft carried by said inner ring, and additional seal means carried by said shaft at one side of said bearing.

4. In a device of the character indicated, a bearing mounting including a block of resilient sound deadening material having a bearing receiving recess therein, said block having integral feet projecting laterally therefrom at opposite sides, said feet having bolt holes therethrough, and bolts extending through said holes for securing said feet only to a support, the main body of said block being free of said bolts whereby it may flex freely relatively to said bolts.

5. In a device of the character indicated, a bearing mounting including a block of resilient sound deadening material having a bearing receiving recess therein, integral foot means on said block, and means for securing said foot means only to a support while the main body of said block is free of said securing means, whereby it may flex freely relatively to said securing means.

6. In a device of the character indicated, a flat block of rubber of generally semi-circular form having a substantially flat base and integral feet projecting laterally of said block, said feet at points spaced from the main body of said block having bolt holes therethrough, bolts extending through said holes for securing said feet only to a support while leaving said block free to flex, said block having a circular bearing receiving recess therein substantially concentric with said semi-circular portion of said block, and integral lip means adjacent said bearing receiving recess for holding a bearing axially.

7. In a device of the character indicated, a bearing housing including a block of rubber to be secured to a support, said block having a bearing receiving recess therein, means for securing said block to a support, said block at the side fitting said support being cut away so as to space the block and support a slight distance apart beneath the region of said bearing recess, whereby bearing pressure in said recess in the direction of said support may flex the rubber freely at the portion thereof which is spaced away from the support.

FAYETTE LEISTER.